US008481920B2

(12) United States Patent
Inanc et al.

(10) Patent No.: US 8,481,920 B2
(45) Date of Patent: Jul. 9, 2013

(54) APPARATUS AND METHOD FOR DETERMINING FORMATION DENSITY FROM NUCLEAR DENSITY MEASUREMENTS MADE USING SENSORS AT MORE THAN ONE LOCATION

(75) Inventors: Feyzi Inanc, Spring, TX (US); W. Allen Gilchrist, Fort Davis, TX (US); Eric Sullivan, Houston, TX (US); Tu Tien Trinh, Houston, TX (US); Yi Liu, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 15 days.

(21) Appl. No.: 13/186,086

(22) Filed: Jul. 19, 2011

(65) Prior Publication Data

US 2013/0020479 A1    Jan. 24, 2013

(51) Int. Cl.
*G01V 5/04* (2006.01)
(52) U.S. Cl.
USPC .............. 250/254; 250/269.1; 250/269.2; 250/269.3; 250/269.4
(58) Field of Classification Search
USPC ........................................................ 250/254
See application file for complete search history.

(56) References Cited

U.S. PATENT DOCUMENTS

| 4,596,926 | A | 6/1986 | Coope |
|---|---|---|---|
| 4,698,501 | A | 10/1987 | Paske |
| 4,705,944 | A | 11/1987 | Coope |
| 5,451,779 | A | 9/1995 | Spross et al. |
| 5,581,024 | A | 12/1996 | Meyer, Jr. et al. |
| 6,150,822 | A * | 11/2000 | Hong et al. ................. 324/338 |
| 6,307,199 | B1 | 10/2001 | Edwards et al. |
| 6,918,293 | B2 | 7/2005 | Moake et al. |
| 7,282,704 | B2 | 10/2007 | Guo |
| 7,295,928 | B2 | 11/2007 | Hassan et al. |
| 7,571,770 | B2 | 8/2009 | DiFoggio et al. |
| 7,818,128 | B2 | 10/2010 | Zhou et al. |
| 2007/0057171 | A1 | 3/2007 | Stoller et al. |
| 2007/0114062 | A1* | 5/2007 | Hall et al. ...................... 175/50 |
| 2007/0186639 | A1* | 8/2007 | Spross et al. ............. 73/152.03 |
| 2010/0095757 | A1 | 4/2010 | Hansen |
| 2011/0253448 | A1* | 10/2011 | Trinh et al. ..................... 175/50 |

FOREIGN PATENT DOCUMENTS

WO    WO2008094050 A2    8/2008

OTHER PUBLICATIONS

International Search Report and Written Opinion dated Jan. 2, 2013 for International Application No. PCT/US2012/046181.

* cited by examiner

*Primary Examiner* — Marcus Taningco
(74) *Attorney, Agent, or Firm* — Cantor Colburn LLP

(57) ABSTRACT

In one aspect, the present disclosure provides an apparatus for determining formation density. One embodiment of the apparatus includes a bottomhole assembly having a drill bit attached to end thereof for drilling through a formation, a first sensor in the drill bit configured to provide first signals for determining a first density of the formation proximate to the drill, a second sensor distal from the first sensor configured to provide signals for determining density of a second density of the formation, and a processor configured to determine the formation density from the first density and the second density.

16 Claims, 4 Drawing Sheets

APPARATUS AND METHOD FOR DETERMINING FORMATION DENSITY FROM NUCLEAR DENSITY MEASUREMENTS MADE USING SENSORS AT MORE THAN ONE LOCATION

BACKGROUND INFORMATION

1. Field of the Disclosure

This disclosure relates generally to determining formation density using multiple nuclear density measurements.

2. Brief Description of the Related Art

Oil wells (wellbores) are usually drilled with a drill string that includes a tubular member having a drilling assembly (also referred to as the bottomhole assembly or "BHA") with a drill bit attached to the bottom end thereof. The drill bit is rotated to disintegrate the earth formations to drill the wellbore. The BHA includes devices and sensors for providing information about a variety of parameters relating to the formation. Formation density is one such parameter. A conventional method of determining formation density utilizes a nuclear sensor that includes a nuclear source (such as a chemical source or a neutron generator) and a pair of spaced nuclear detectors. The accuracy of formation density measurements determined by such a conventional method is relatively high, but the spatial resolution can be low because the spatial resolution is a function of the distance between the source and the detectors and their distance from the drill bit. The spatial resolution is useful to distinguish the bed boundaries between changing formations. While spatial resolution can be improved by closely locating the source and a detector, such placement provides less accurate measurements.

The disclosure herein provides an improved apparatus and method of determining formation density utilizing at least two nuclear measurements.

SUMMARY

In one aspect, the present disclosure provides an apparatus for determining formation density. One embodiment of the apparatus includes a bottomhole assembly having a drill bit attached to end thereof for drilling through a formation, a first sensor in the drill bit configured to provide first signals for determining a first density of the formation proximate to the drill, a second sensor distal from the first sensor configured to provide signals for determining density of a second density of the formation, and a processor configured to determine the formation density from the first density and the second density.

In another aspect, the present disclosure provides a method for determining formation density. In one embodiment, the method includes conveying into a wellbore a bottomhole assembly having a drill bit at end thereof, wherein the drill bit includes a first sensor configured to provide first signals for determining a first density of the formation proximate to the drill bit and a second sensor distal from the first sensor configured to provide signals for determining a second density of the formation; activating the first sensor and determining the first density of the formation using signals from the first sensor; activating the second sensor and determining the second density of the formation using signals from the second sensor; and determining a third density of the formation from the first density of the formation and the second density of the formation.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings in which like elements are generally designated by like numerals and wherein.

DETAILED DESCRIPTION

The present disclosure relates to apparatus and methods for determining formation density during drilling of a wellbore using a nuclear sensor in the BHA and another nuclear sensor in the drill bit. The present disclosure is susceptible to embodiments of different forms. The drawings show and the written specification describes specific embodiments of the present disclosure with the understanding that the present disclosure is to be considered an exemplification of the principles of the disclosure and is not intended to limit the disclosure to that illustrated and described herein.

Figure 1:
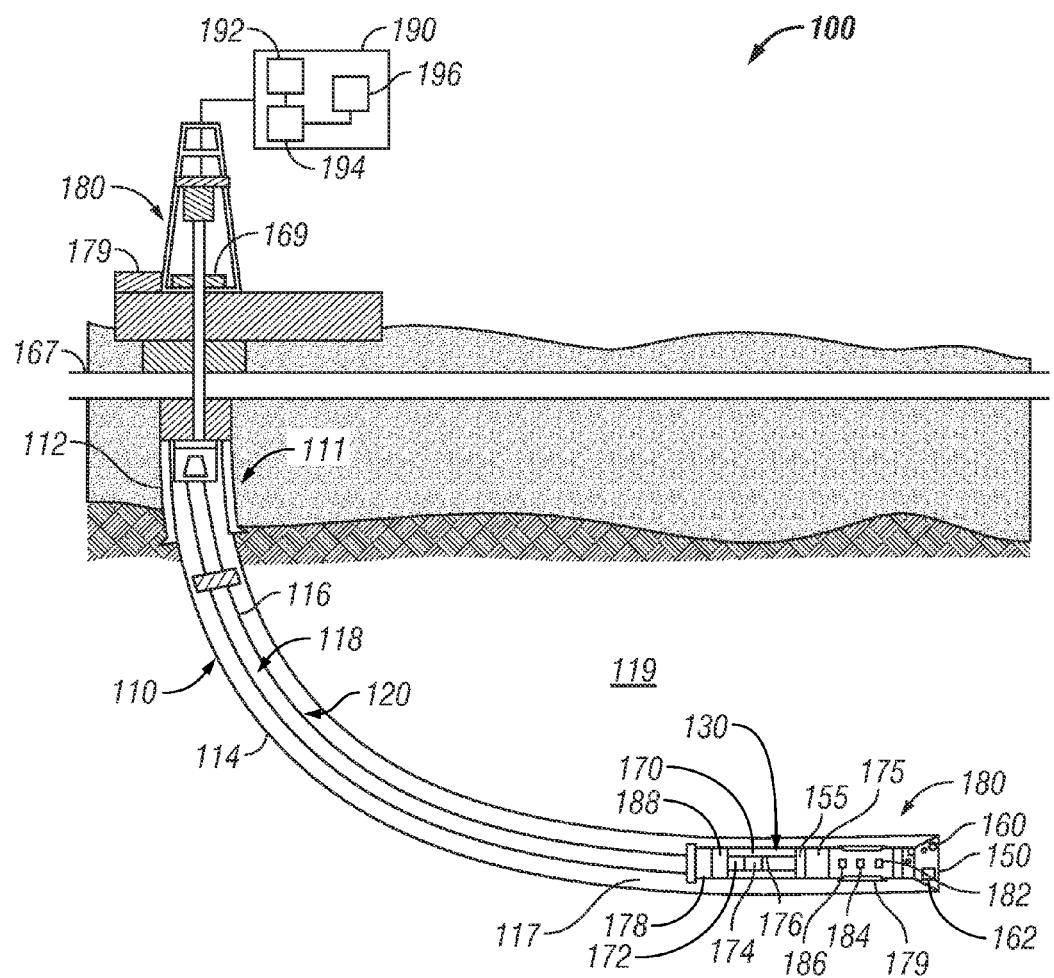
FIG. 1 is a schematic diagram of an exemplary drilling system that includes a drilling assembly that includes a first nuclear sensor unit in the drilling assembly and a second nuclear sensor unit in the drill bit for determining formation density during drilling of a wellbore, according to one embodiment of the disclosure.

FIG. 1 is a schematic diagram of an exemplary drilling system 100 that shows a wellbore 110 that includes an upper section 111 with a casing 112 installed therein and a lower section 114 that is being drilled with a drill string 118. The drill string 118 includes a tubular member 116 that carries a drilling assembly 130 (also referred to as the bottomhole assembly or "BHA") at its bottom end. The tubular member 116 may be made up by joining drill pipe sections or it may be coiled tubing. A drill bit 150 is attached to the bottom end of the BHA 130 for disintegrating the rock formation to drill the wellbore 110 of a selected diameter in the formation 119. The terms wellbore and borehole are used herein as synonyms.

The drill string 118 is shown conveyed into the wellbore 110 from an exemplary rig 180 at the surface 167. The exemplary rig 180 shown in FIG. 1 is a land rig for ease of explanation. The apparatus and methods disclosed herein may also be utilized with rigs used for drilling offshore wellbores. A rotary table 169 or a top drive (not shown) coupled to the drill string 118 at the surface may be utilized to rotate the drill string 118 and thus the drilling assembly 130 and the drill bit 150 to drill the wellbore 110. A drilling motor 155 (also referred to as "mud motor") may also be provided to rotate the drill bit. A control unit (or controller) 190, which may be a computer-based unit, may be placed at the surface 167 for receiving and processing data transmitted by the sensors in the drill bit and other sensors in the drilling assembly 130 and for controlling selected operations of the various devices and sensors in the drilling assembly 130. The surface controller 190, in one embodiment, may include a processor 192, and a data storage device (also referred to as a computer-readable medium) 194 for storing data and computer programs 196 accessible to the processor for performing various functions disclosed herein. The data storage device 194 may be any suitable device, including, but not limited to, a read-only memory (ROM), a random-access memory (RAM), a flash memory, a magnetic tape, a hard disc and an optical disk. To drill wellbore 110, a drilling fluid from a source 179 is pumped under pressure into the tubular member 116. The drilling fluid discharges at the bottom of the drill bit 150 and returns to the surface via the annular space (also referred as the "annulus") 117 between the drill string 118 and the inside wall of the wellbore 110.

Still referring to FIG. 1, the drill bit 150, includes a nuclear sensor that in one configuration includes a radiation source 160, such as Cesium-137 (CS-137 configured to induce gamma rays into the formation 119. The induced gamma rays interact with the formation and scatter. A radiation detector 162 detects the scattered gamma rays. Such a detector may also detect naturally-occurring gamma rays in the formation. Naturally-occurring gamma rays are gamma rays that are emitted by the formation in the absence of induced gamma rays from a radiation source. Such naturally-occurring gamma rays are referred to herein as passive gamma rays and the mode of operation in which passive gamma rays are detected is referred to as the passive mode. In another aspect, the source 160 may be a neutron source, such as an Americium-241/Beryllium (AmBe) source. When neutron radiation is induced in the formation 119, neutrons scatter in the formation. In such a case, detector 162 in the drill bit detects scattered neutrons from the formation. Sometimes, the induced radiation may cause emission of secondary radiation in the formation. Both the scattered and secondary radiations are referred to herein as secondary radiation and the mode of operation in which secondary radiation is detected is referred to as the active mode. In another aspect, the drill bit may include both neutron and the gamma ray sources and sensors to detect both the gamma rays and the neutrons from the formation. In yet another aspect, the radiation from the source 160 may be selectively exposed to the formation 119 so that the detector 160 detects secondary radiation during specific time periods after the formation has been exposed to such radiation. The passive gamma rays may be detected during time periods when the radiation from the source is not exposed to the formation. The drilling assembly 130 may further include one or more downhole sensors (also referred to as the measurement-while-drilling (MWD) sensors (collectively designated by numeral 175) and at least one control unit (or controller) 170 for processing data received from the MWD sensors 175 and the drill bit 150. The controller 170 may include a processor 172, such as a microprocessor, a data storage device 174 and a program 176 for use by the processor to process downhole data. In one aspect, the controller 170 and/or 190 processes signals from the detector 162 and determines the density of the formation by methods known in the art, which density may be provided in the form of a log. The log depicts the formation density corresponding to the wellbore depth. The controllers 170 and 190 communicate information with each other via a two-way telemetry unit 188. The communication method or mechanism may include mud pulse telemetry, acoustic telemetry, electromagnetic telemetry, and one or more conductors (not shown) positioned along the drill string 118 (also referred to a wired-pipe). The data communication links may include metallic wires, fiber optical cables, or other suitable data carriers. A power unit 178 provides power to the electrical sensors and circuits in the drill bit and the BHA. In one embodiment, the power unit 178 may include a turbine driven by the drilling fluid and an electrical generator.

Still referring to FIG. 1, the bottomhole assembly 130 includes a nuclear sensor 180 in the bottomhole assembly for determining formation density. In one embodiment the sensor 180 may include a nuclear source 182, a short spacing detector (also referred herein as a radiation sensor) 184 and a long spacing detector 186. In one aspect, the source 182 and the detectors 184 and 186 may be placed on a pad 179 that extends from the bottomhole assembly body to cause the source and the detectors to contact the wellbore wall. Such nuclear sensors are well known in the art and are thus not described in detail. During drilling of the wellbore 110, the source 182 is activated and scattered gamma rays responsive to the induced radiation are detected by the detectors 184 and 186. The controller 170 and/or 190 processes signals from the detectors 184 and 186 to determine a formation density and produces a formation density log. Such a log is described in more detail in reference to FIGS. 3 and 4.

Figure 2:
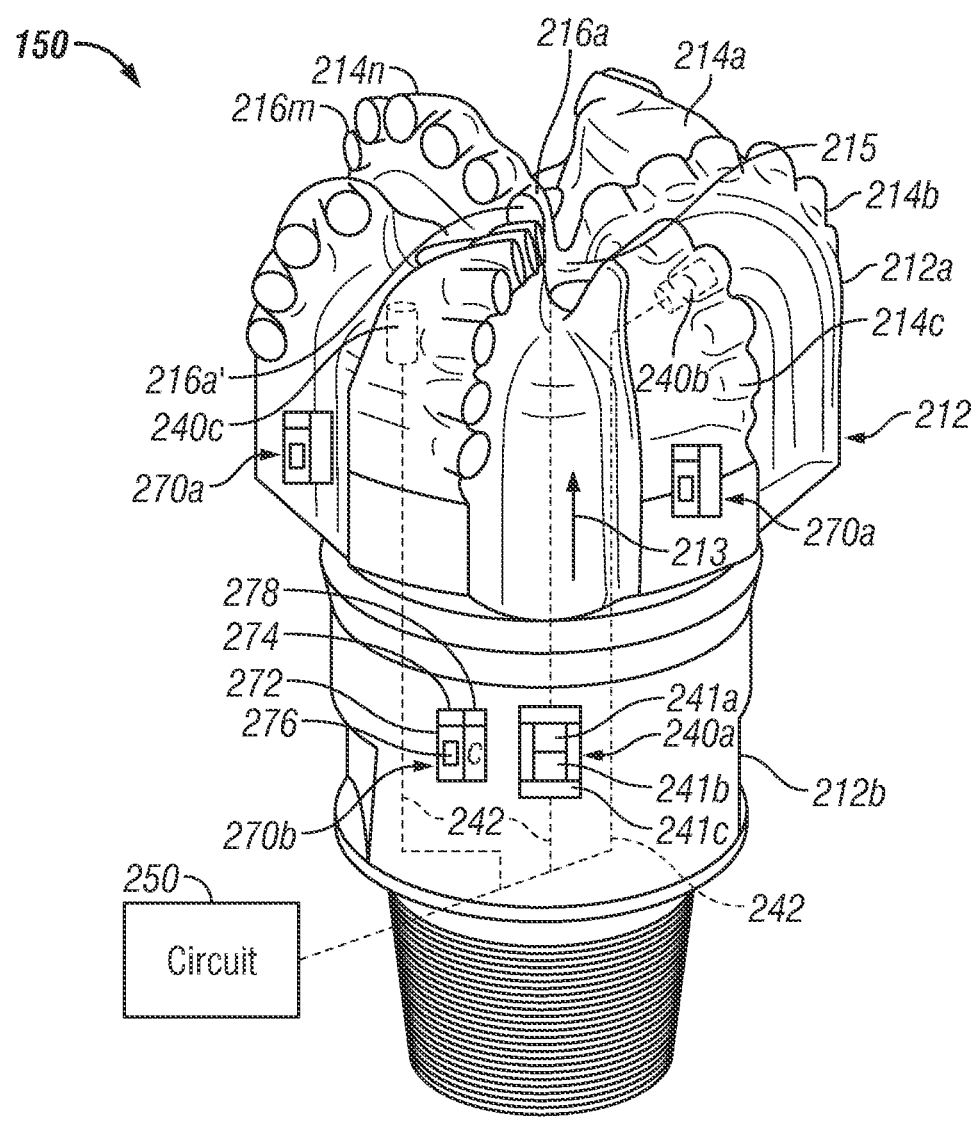
FIG. 2 is an isometric view of an exemplary drill bit that includes a nuclear sensor unit that includes a radiation source and a radiation detector configured to determine the formation density during drilling of the wellbore.

FIG. 2 shows an isometric view of an exemplary drill bit 150 that may include a nuclear sensor that comprises a detector or radiation sensor (generally denoted by numeral 240) and a source (generally denoted by numeral 270) placed at suitable locations in the drill bit. A polycrystalline diamond compact (PDC) drill bit is shown for explanation purposes. Any other type of drill bit may be utilized for the purpose of this disclosure. The drill bit 150 is shown to include a drill bit body 212 comprising a cone 212a and a shank 212b. The cone 212a includes a number of blade profiles (or profiles) 214a, 214b, ... 214n. A number of cutters are placed along each profile. For example, profile 214a is shown to contain cutters 216a-216m. All profiles are shown to terminate at the bottom or face 215 of the drill bit 150. Each cutter has a cutting surface or cutting element, such as element 216a' of cutter 216a, that engages the rock formation when the drill bit 150 is rotated during drilling of the wellbore.

FIG. 2 illustrates a variety of positions or locations for the radiation sensor 240. In one arrangement, a radiation sensor 240a may be placed in the shank 212b. In another embodiment, a radiation sensor 240b may be integrated into a cutter. Such sensors may be placed at any other suitable locations in the drill bit 150, including, but not limited to the cone 212a, such as radiation sensor 240c. The radiation sensors 240a, b, c may be configured to receive natural radiation and/or secondary radiation from the formation axially ahead of the drill bit or from azimuthal locations. Conductors 242 provide signals from the sensor package 240 to a circuit 250 for processing sensor signals. The circuit 250 or a portion thereof may be placed in the drill bit 150 or outside the drill bit. The circuit 250, in one aspect, amplifies signals from the sensor 240 and processes such signals to provide a desired property of interest of the formation.

In one aspect, a gamma ray sensor may utilize a sensor element, such as a scintillation crystal, such as sodium iodide (NaI) crystal, optically coupled to a photomultiplier tube. Output signals from the photomultiplier tube may be transmitted to a suitable electronics package which may include pre-amplification and amplification circuits. The amplified sensor signals may be transmitted to the processor 172. In certain applications, scintillation gamma ray detectors, such as those incorporating NaI crystal, may not be suitable due to their size and use of photomultiplier tubes. In certain other embodiments of the disclosure, solid state gamma ray detectors may be utilized. Solid state detectors are relatively small and may be oriented in any direction in the drill bit. Another embodiment of the disclosure may utilize a photodiode detector whose long-wavelength cutoff is in the short-wavelength range and has reduced temperature sensitivity. The photodiode may be matched with scintillation devices having an output matching the response curve of the photodiode for use with nuclear logging devices. In some embodiments of the present disclosure a downhole cooling device may be provided for the sensor, such as a device using quantum thermo-tunneling of electrons. An exemplary cooling process is disclosed in U.S. Pat. No. 7,571,770 to DiFoggio et al., having the same assignee as the present disclosure and the contents of which are incorporated herein by reference.

Still referring to FIG. 2, a radiation source may be placed at any suitable location in the drill bit 150. As an example, FIG. 2 shows a source 270a placed in the cone 212a or a source 270b in the shank 212b. As noted above, source 270a may be any suitable such as a cesium source, including, but not limited to CS-137 or another gamma source such as AmBe or a neutron source. In one aspect, source 270a or 270b may include a source element 276 enclosed in a casing 272 having a window 274 that can be selectively opened and closed for selected time periods (also referred to as time windows). In this manner radiation from the source may be induced into the formation for selected time periods. The sensors 240a, b, c detect radiation scattered from the formation responsive to the induced radiation and/or detect naturally-occurring gamma rays as the case may be. The source 270a and 270b may further include a control unit 278 for selectively opening and closing the window 274 to selectively activate and deactivate the sources 276a and 276b as the case may be. In one aspect, the control unit 278 may be a hydraulically-operated device, such as a movable member (for example a shutter) driven by flow of the drilling fluid, or an electrically-operated device, such as an electric motor. Fluid may be supplied in reverse directions to open and close the window 274.

Figure 3:
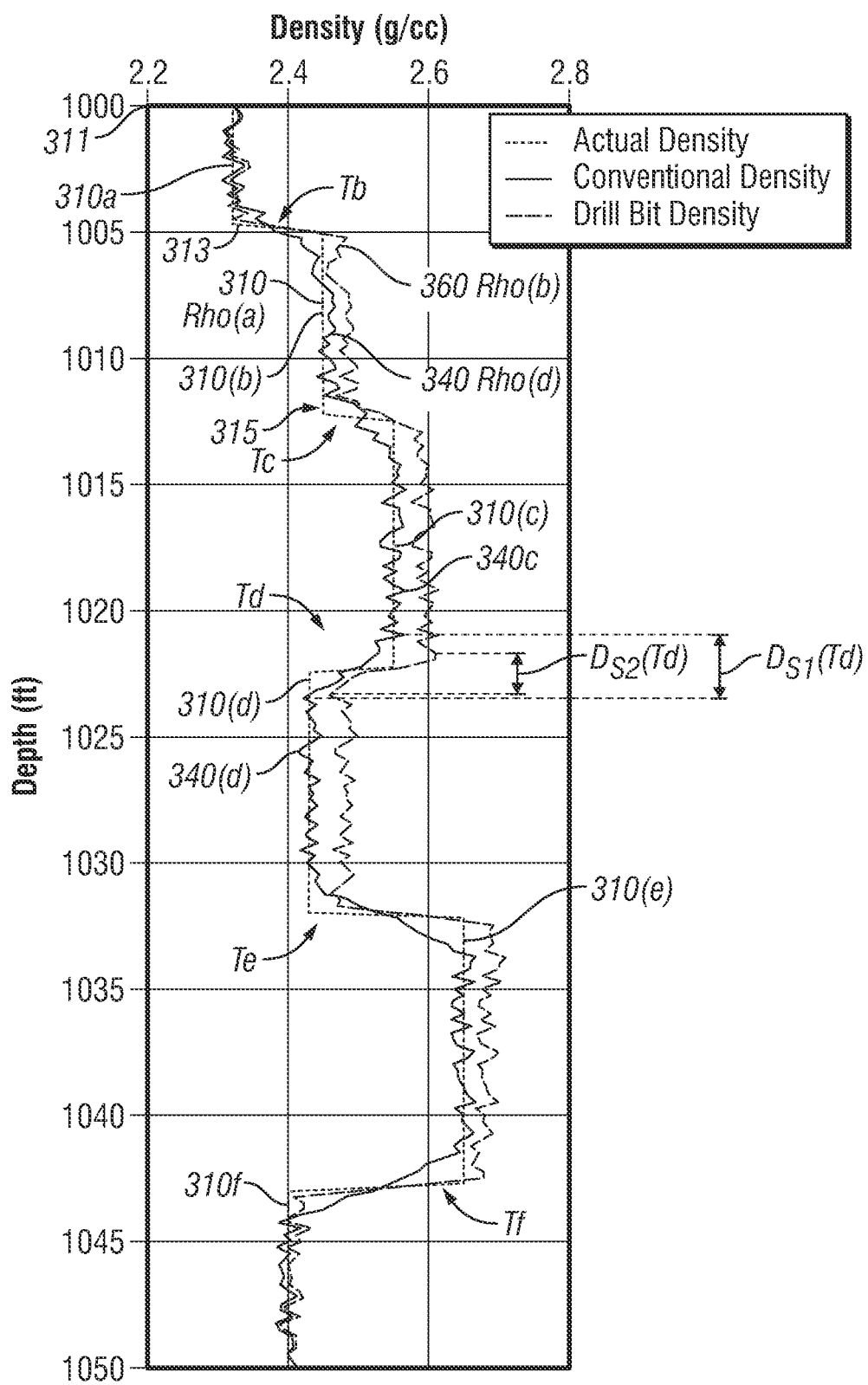
FIG. 3 shows a synthetic log of formation density determined using a nuclear sensor in the BHA and a synthetic formation density log determined using a nuclear sensor in the drill bit relative to an actual or true formation density.

In aspects, during drilling, the controller circuit 250 and/or controller 170 and/or controller 190 determine the formation density of the formation 119 utilizing signals received from a radiation detector in the drill bit and may also be configured to provide a formation density log, such as shown in FIG. 3. The controller 170 and/or 190 utilize the formation density measurements from the nuclear sensor in the drill bit and the nuclear sensor in the BHA to determine a corrected formation density, as described in reference to FIGS. 3 and 4.

FIG. 3 shows a log 310 of an example of an actual or true formation density as a function of depth, a synthetic log 340 of the formation density determined using a nuclear sensor in the BHA and a synthetic log 360 of the formation density determined using a nuclear sensor in the drill bit. In the particular exemplary logs of FIG. 3, the actual formation density Rho(a) is substantially constant at a value 310a from depth 311 (about 1000 ft) to depth 313 (about 1005 ft). Rho(a) changes from 310a to 310b as the rock formation changes at the transition zone or bed boundary Tb (around depth 313). Rho(a) then remains substantially constant at 310b from the transition zone Tb to the next transition zone Tc located proximate to depth 315. Rho(a) then changes at subsequent transition zones Tc, Td, Te and Tf from densities 310b to 310c to 310d to 310e and finally to 310f, as shown in FIG. 3.

Still referring to FIG. 3, the log 340 of formation density Rho(b) determined from the nuclear sensor in the BHA follows the actual formation density relatively closely, except proximate to the transition zones. For example, the formation density 340c transitions to density 340d over a depth Ds1(Td) at transition zone Td. It is known that the larger the transition depth, the lower the spatial resolution of the sensor.

Still referring to FIG. 3, the log 360 of formation density Rho(d) determined from the nuclear sensor in the drill bit does not follow the actual formation density log 310 as close as the log 340 does. However, the transition depths for the sensor in the drill bit are less than the corresponding transition depths for the density log 360 for the sensor in the BHA. For example, the transition depth Ds2(Td) for the sensor in the drill bit is less than the transition depth Ds1(Td) for the sensor in the BHA at the transition zone Td. The transition depths for the sensor in the drill bit for transition zones Tb, Td, Te and Tf are also less than the corresponding transition depths for the sensor in the BHA.

Figure 4:
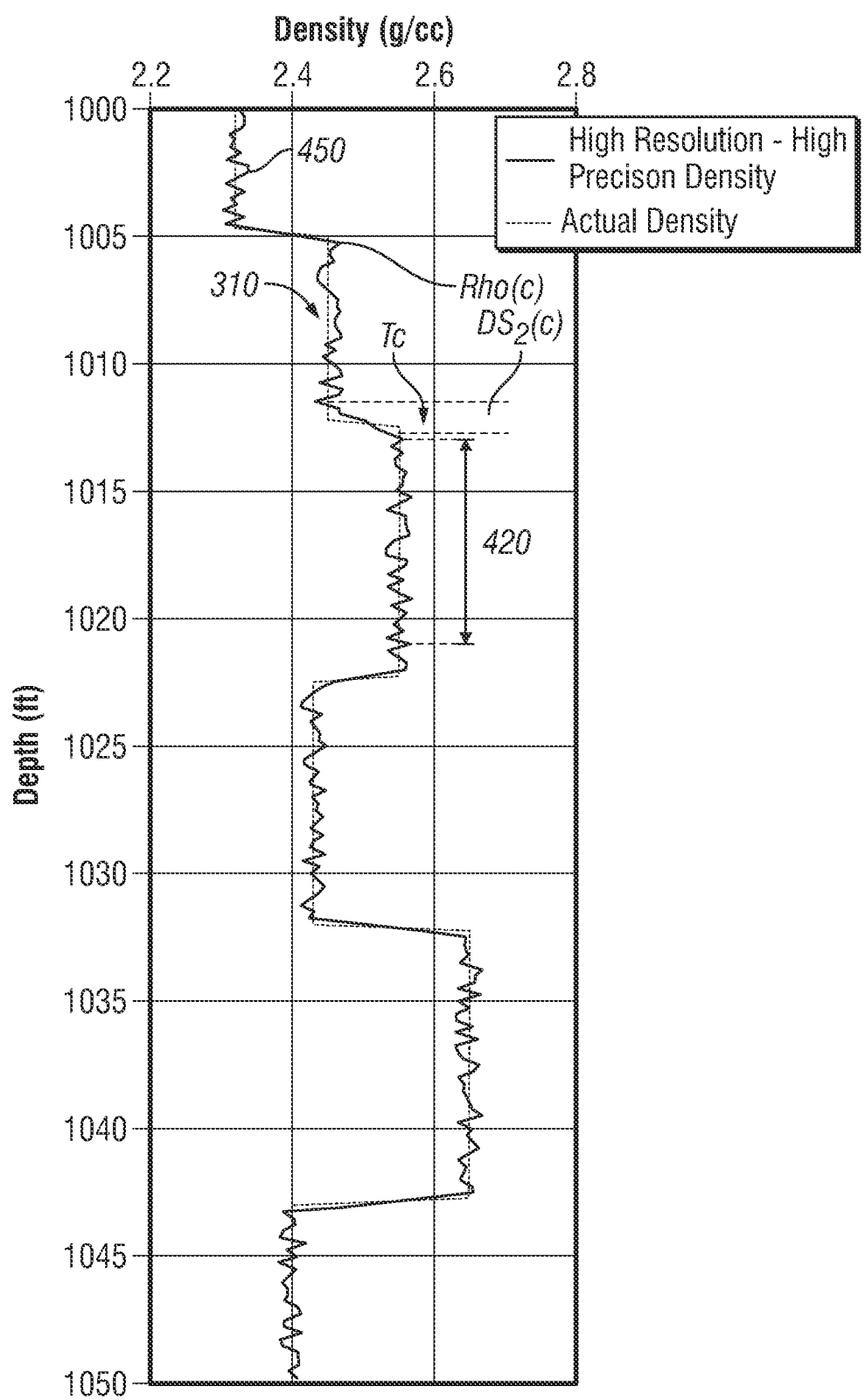
FIG. 4 shows a synthetic log of the formation density determined by combining the formation density logs from the nuclear sensor logs in the BHA and the drill bit relative to the true formation density log.

FIG. 4 shows log 310 of the actual or true formation density as a function of depth shown in FIG. 3 and a log 450 of the formation density Rho(c) determined by combining the formation density measurements shown in logs 340 and 360 of FIG. 3. In one aspect, the formation density log 450 may be obtained by utilizing the formation density measurements from the log 340 and log 360, such as by combining these two logs. In one aspect the combined log 450 may include the high precision formation density measurements in the homogenous zones (constant formation density values) from the sensor in the BHA and high spatial resolution formation density measurement from the sensor in the drill bit for the transition zones. Log 450 is such a combination log. As an example, a comparison the combined log 450 with the logs 340 and 360 shows that the log 450 is the same as log 340 for the depth 420 and the same as log 360 for the transition depth Ds2(c).

The foregoing description is directed to particular embodiments for the purpose of illustration and explanation. It will be apparent, however, to persons skilled in the art that many modifications and changes to the embodiments set forth above may be made without departing from the scope and spirit of the concepts and embodiments disclosed herein. It is intended that the following claims be interpreted to embrace all such modifications and changes.

The invention claimed is:

1. An apparatus for determining density of a formation, comprising:
 a bottomhole assembly having a drill bit attached to end thereof for drilling through a formation;
 a first sensor in the drill bit configured to provide first signals for determining a first density of the formation proximate to the drill bit;
 a second sensor distal from the first sensor configured to provide signals for determining a second density of the formation; and
 a processor configured to determine a third density of the formation by selecting the third density from the first density at a transition zone of the formation and selecting the third density from the second density at a non-transition zone of the formation.

2. The apparatus of claim 1, wherein the:
 first sensor includes a first source and a first detector in the drill bit; and
 second sensor includes a second source and at least one second detector in the bottomhole assembly.

3. The apparatus of claim 2, wherein each of the first source and the second source is a nuclear source and each of the first detector and the at least one second detector is a gamma ray detector.

4. The apparatus of claim 1, wherein the first source is chemical source and the second source is a nuclear chemical source or a neutron source.

5. The apparatus of claim 1, wherein the first formation density comprises a first log of the density of the formation corresponding to the wellbore depth and the second density of the formation comprises a second log of the density of the formation corresponding to the wellbore depth.

6. The apparatus of claim 5, wherein the processor is configured to determine a third density log of the formation that is a combination of density values from the first density log at depths corresponding to transition zones of the formation and the density values from the second density log at depths corresponding to non-transition zones of the formation.

7. The apparatus of claim 1, wherein the processor is configured to determine a characteristic of the formation from the third density of the formation.

8. The apparatus of claim 7, wherein the characteristic of the formation is a bed boundary condition determined from a change in the density of the formation.

9. A method of determining density of a formation, comprising:
  conveying into a wellbore a bottomhole assembly having a drill bit at end thereof, wherein the drill bit includes a first sensor configured to provide first signals for determining a first density of the formation proximate to the drill and the bottomhole assembly includes a second sensor distal from the first sensor configured to provide signals for determining a second density of the formation;
  activating the first sensor and determining the first density of the formation using signals from the first sensor;
  activating the second sensor and determining the second density of the formation using signals from the second sensor; and
  determining a third density of the formation by selecting the third density from the first density of the formation at a depth corresponding to a transition zone of the formation and selecting the third density from the second density of the formation at a depth corresponding to a non-transition zone of the formation.

10. The method of claim 9, wherein the each of the first sensor and the second sensor is a nuclear sensor.

11. The method of claim 9, wherein determining the first formation density comprises determining a first log of the density of the formation corresponding to the wellbore depth and determining the second density of the formation comprises a second log of the density of the formation corresponding to the wellbore depth.

12. The method of claim 11 further comprising determining a third log of the density by selecting values from the first density log at depths of the formation corresponding to transition zones of the formation and values from the second density log at depths of the formation corresponding to non-transition zones of the formation.

13. The method of claim 9 further comprising determining a characteristic of the formation from the third density of the formation.

14. The method of claim 12 further comprising determining a bed boundary condition from the third density of the formation.

15. The method of claim 9, wherein the first sensor includes a nuclear source and a radiation detector at the face or side of the drill bit.

16. A method of determining density of a formation during drilling of a wellbore, comprising:
  drilling the wellbore with a bottomhole assembly having a drill bit at end thereof;
  inducing in the formation radiation from a first source in the drill bit;
  detecting first radiation from the formation responsive to the induced radiation from the first source by a first detector in the drill bit and providing first signals representative of the detected first radiation;
  inducing in the formation radiation from a second source distal from the drill bit;
  detecting second radiation from the formation responsive to the induced radiation from the second source by a second detector distal from the drill bit and providing second signals representative of the detected second radiation;
  determining a first formation density from the first signals and a second formation density from the second signals; and
  determining a third density of the formation by selecting the third density from the first density of the formation at a depth corresponding to a transition zone of the formation and selecting the third density from the second density of the formation at a depth corresponding to a non-transition zone of the formation.

* * * * *